No. 620,429. Patented Feb. 28, 1899.
H. F. DETERDING.
PERENNIAL WEED EXTERMINATOR.
(Application filed Jan. 24, 1898.)
(No Model.)
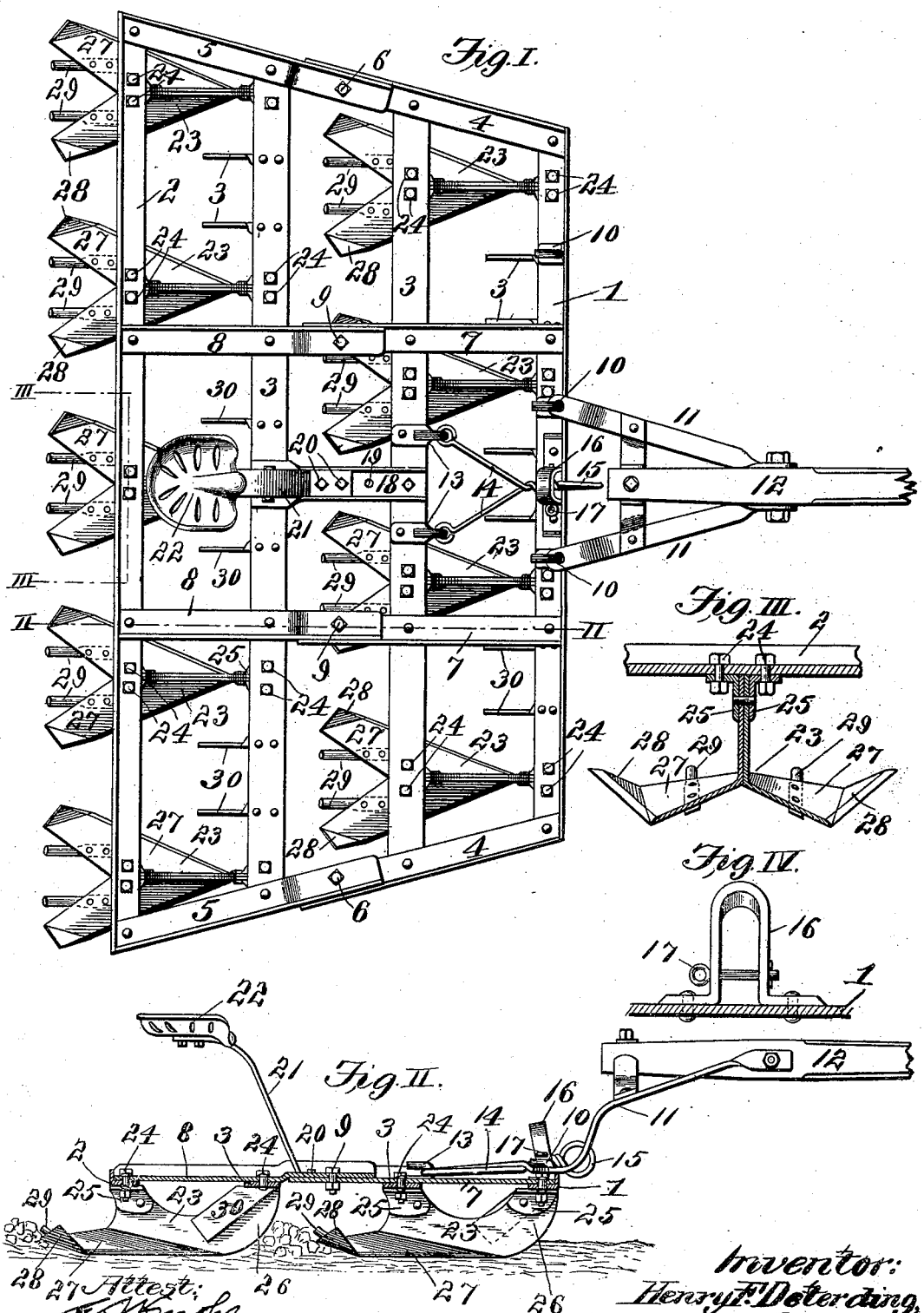
Inventor:
Henry F. Deterding,

UNITED STATES PATENT OFFICE.

HENRY F. DETERDING, OF COMMERCE, MISSOURI.

PERENNIAL-WEED EXTERMINATOR.

SPECIFICATION forming part of Letters Patent No. 620,429, dated February 28, 1899.

Application filed January 24, 1898. Serial No. 667,687. (No model.)

*To all whom it may concern:*

Be it known that I, HENRY F. DETERDING, a citizen of the United States, residing at Commerce, in the county of Scott and State of Missouri, have invented certain new and useful Improvements in Perennial-Weed Exterminators or Weeding-Harrows, of which the following is a full, clear, and exact description, reference being had to the accompanying drawings, forming part of this specification.

My invention relates in particular to a weeding-harrow or exterminator of such weeds as require repeated and heroic efforts to destroy them.

My invention embodies a bladed harrow so constructed as to most effectually cut and agitate such sprout-roots and weeds of all description in such manner as to render them perfectly lifeless.

My invention consists in features of novelty hereinafter fully described, and pointed out in the claims.

Figure I is a top view of my improvement. Fig. II is a view illustrating the cross-bars and one of the brace-bars of the pulverizer-frame in section, taken on line II II, Fig. I, and showing other parts in side elevation. Fig. III is a sectional view taken on the line III III, Fig. I. Fig. IV is a front view of the shackle or loop that receives the draft-link.

Referring to the frame of the pulverizer, 1 designates a forward cross-bar, 2 the rear cross-bar, and 3 intermediate cross-bars, all of which are arranged parallel with each other. At each end of the frame is a side bar composed of sections 4 and 5, joined by a removable fastening, such as bolts 6, and between the side bars are intermediate brace-bars composed of sections 7 and 8, joined by removable fastenings, such as bolts 9, similar to those that join the sections of the side bars.

The bars 1 2 3 and the bar-sections 4, 5, 7, and 8 are joined together by permanent fastenings, such as rivets, except at points of separation, where I use removable bolts 6 and 9 to connect the sections of the end bars and the bars between them, so that the device is rendered separable into two parts for boxing when handling, storing, or shipping. The bars 1 2 3 and sections 4, 5, 7, and 8 are preferably of angle-bars, of which the flanges extend upwardly, as shown, such form of bars being used owing to its combining strength and lightness of weight. The bars 3 may be flat, as shown, or they may be of angle form with the flanges extending downwardly.

10 designates hooks attached to the forward cross-bar 1, located equidistant from each other. There are preferably three of these hooks, as shown, and two of them are located at approximately the same distance from either side of the pulverizer-frame, while the third hook is located intermediate of one of the centrally-located hooks and at one side of the frame. Either the two centrally-located hooks or one of those centrally located and the outer hook are designed to receive the arms 11 of a tongue 12, said arms having holes therein that the hooks enter, thus providing a detachable connection of the tongue to the pulverizer. The object of the provision of the series of hooks will hereinafter appear.

Secured to the forward one of the intermediate cross-bars 3 are hooks 13, that receive the rear ends of a draft-link 14, the forward end of which is formed into a loop 15, adapted to receive a clevis attached to a doubletree. 16 is a shackle on the cross-bar 1, that receives the forward free end of the link 14. This shackle is designed to confine and limit the movement of the link 14, and for the purpose of further limiting the link a removable pin 17 is employed when desired.

The link 14 provides for the draft connection to the pulverizer and the tongue 12 is used for guiding only. The provision of the series of hooks 10 enables the application of the tongue-arms 11 to varying positions on the pulverizer-frame, according to whether an even or odd number of horses are employed. When an even number of horses are employed, such as two or four, the horses are placed equally on each side of the tongue and the tongue is attached to the two centrally-arranged hooks 10; but when an uneven number of horses are employed it is necessary to apply the tongue to one side of the center of the pulverizer-frame, and in such instance the tongue is connected to one of the central hooks and the outer hook in order to equalize the drag of the pulverizer.

By the use of the pin 17 in the shackle 16 I am enabled to control to a considerable extent the depth of the cut into the ground by the pulverizer. Where the depth of the cut has a tendency toward excess, the pin 17 is inserted above the link 14, thereby confining the link beneath it, causing the forward end of the pulverizer to be supported to a degree in the draft. This also is the position desirable for the link when a heavy doubletree is used, the weight of which has a tendency to depress the forward end of the pulverizer. If the pulverizer does not cut deep enough, the pin 17 is inserted beneath the link, thereby causing the forward end of the pulverizer to be depressed when the draft is applied.

18 designates a bar bolted to the intermediate cross-bars 3. This bar is provided with a series of holes 19, adapted to receive bolts 20.

21 is a seat-post that is secured to the bar 18 by the bolts 20, and 22 is a driver's seat mounted on said post. The bar 18 has upturned flanges that bind against the side edges of the seat-post at its base, forming a groove for its reception. The series of holes 19 provide for the forward and rearward movement of the seat-post, thereby allowing the adjustment of the seat to equalize the driver's weight over the pulverizer as may be desirable to assist in balancing the pulverizer and cause its forward end to enter the ground to the desired depth.

23 designates runner-shaped cutters removably connected to the cross-bars 1, 2, and 3 by means of bolts 24, such cutters being removably connected in order that they may be readily detached to sharpen or repair them.

Each of the cutters 23 is composed of two mating sections runner-shaped, that are welded together longitudinally of their mating portions, thus producing the runner-shaped cutters. These cutters extend in rows or series across the pulverizer-frame from side to side, the forward row being attached to the bar 1 and forward bar 3 and the rear row attached to the rear bars 2 and 3. The cutters of the rear row are are offset from those of the front row.

Each of the cutters 23 has angle-ears 25 riveted thereto, and the bolts 24 pass through these ears to connect the cutters to the frame-bars. At the forward end of each cutter is a colter portion 26. Extending rearwardly from the base of the colter portion are blades or shares 27, that extend rearwardly and incline downwardly in an outward direction, each blade having a horizontal cutting edge, such edges extending diagonally rearward from their forward ends.

At the rear end of each blade 27 is a lip 28, turned upwardly and outwardly from the blade, these lips having their forward edges sharpened to form cutting edges.

29 are agitator-teeth riveted to the blades 27 at their rear ends and extending rearwardly between the rear ends of the blades, these agitators loosening the soil and stirring it as it leaves the blades of the cutters.

The outward slant of the lips 28, together with the agitator-teeth 29, loosens and works the weeds, roots, and sprouts on or near to the top of the cut soil, so as to render them lifeless by the action of the sun and air.

Attached to the frame-bar 1 and rear bar 3, between the forward ends of the cutters, are breaker-prongs 30, that break any clods that lie in their path.

I claim as my invention—

1. In a soil-pulverizer, the combination of a frame, composed of cross-bars extending from side to side thereof, bars extending crosswise of said first-mentioned bars, bladed cutters connected in rows to pairs of said cross-bars, the cutters of one row being offset from the cutters of the other row, and breaker-prongs carried by said first-mentioned bars and arranged intermediate of said cutters, substantially as described.

2. In a soil-pulverizer, the combination of a frame, composed of transverse bars arranged parallel cutters having diverging blades and provided with two connections to pairs of said bars whereby they are rigidly attached to said frame, said blades extending diagonally rearwardly and inclined downwardly and outwardly and having lips at their rear ends, and agitator-teeth carried by said blades intermediate of their rear ends, substantially as described.

3. In a soil-pulverizer, the combination of a frame composed of cross-bars extending from side to side thereof, bars extending crosswise of said first-mentioned bars, a bar connected to the central of said first-mentioned bars and provided with a series of holes, and a seat-carrying post detachably and movably secured to said bar, substantially as described.

4. In a soil-pulverizer, the combination of a frame, composed of crossing bars, a draft-link attached to said frame, a series of hooks on said frame, and a detachable tongue having arms adapted to be connected to said hooks, substantially as and for the purpose set forth.

5. In a soil-pulverizer, the combination of a frame composed of crossing bars, a draft-link attached to said frame, a series of hooks on said frame, a detachable tongue having arms adapted to be connected to said hooks, a shackle carried by said frame and adapted to inclose said link, and a pin in said shackle adapted to confine and limit the movement of said link, substantially as described.

6. In a soil-pulverizer, the combination of a frame, cutters composed of mating sections welded together, colter portions at the forward ends of said cutters, each cutter having diverging blades extending diagonally rearwardly, and having lips at their rear ends and agitator-teeth intermediate of their rear ends, and angle-ears riveted to said cutters through means of which the cutters are secured to said frame, substantially as described.

HENRY F. DETERDING.

In presence of—
E. S. KNIGHT,
A. V. ALEXANDER.